Oct. 28, 1924.
M. M. TITTERINGTON
STRAIGHT LINE INDICATOR
Filed April 28, 1923
1,513,680
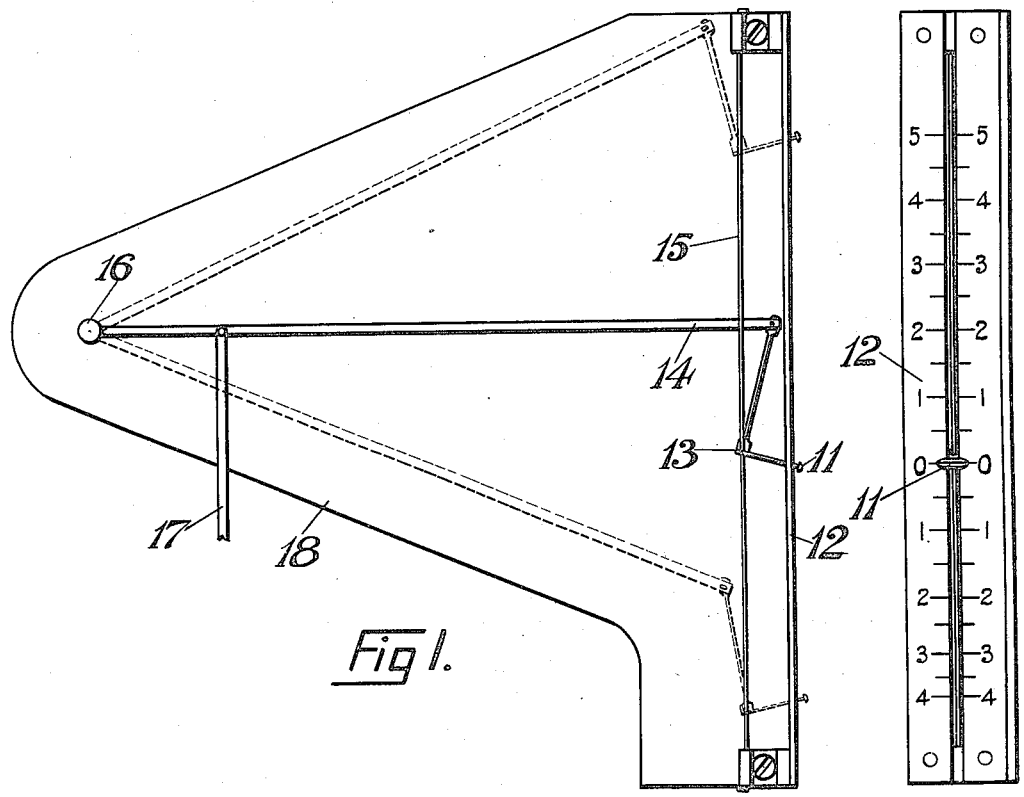
Fig 1.
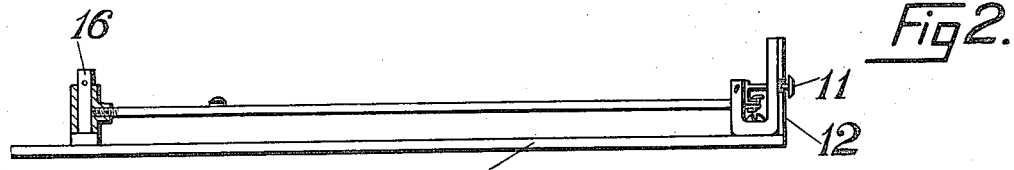
Fig 2.
Fig 3.
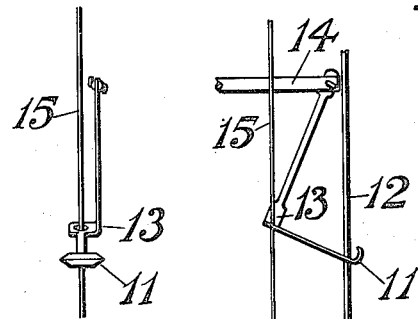
Fig 4.    Fig 5.
INVENTOR.
Morris M. Titterington Patented Oct. 28, 1924.

1,513,680

UNITED STATES PATENT OFFICE.

MORRIS M. TITTERINGTON, OF BROOKLYN, NEW YORK, ASSIGNOR TO PIONEER INSTRUMENT COMPANY, A COPARTNERSHIP CONSISTING OF CHARLES H. COLVIN, BRICE H. GOLDSBOROUGH, AND MORRIS M. TITTERINGTON, OF BROOKLYN, NEW YORK.

STRAIGHT-LINE INDICATOR.

Application filed April 28, 1923. Serial No. 635,405.

*To all whom it may concern:*

Be it known that I, MORRIS M. TITTERINGTON, a citizen of the United States, and resident of Brooklyn, in the county of Kings and State of New York, have invented a certain new and useful Straight-Line Indicator, of which the following is a specification.

My invention relates to indicating mechanisms for meters and other instruments and devices.

An object of my invention is to provide an indicating mechanism in which the index moves in an approximately straight line, thereby saving space as compared to the usual type of indicator with index or hand moving in a circle. A further object is to provide a mechanism of such construction that it requires little power for its operation. Other objects and advantages will appear as the invention is hereinafter disclosed.

Referring to the drawings which show what I now consider a preferred form of my invention :—

Figure 1 represents a side elevation,
Figure 2 represents a front view,
Figure 3 represents a bottom view,
Figure 4 represents a front view of the index and associated parts only, and
Figure 5 represents a side view of the part shown in Figure 4.

Referring to the drawings, the index 11 is adapted to move relatively to the scale 12 and to be read in relation to this scale. The index 11 is the forward extension of the slider 13 which is pivotally attached to the end of the arm 14 and slidably carried on the guide-wire 15. The arm 14 is pivotally supported on the axle 16. The mechanism or apparatus (not shown), the movement of which is to be indicated, is attached to the arm 14 by means of the link 17. The scale 12, guide-wire 15 and axle 16 are fixed in their relation to each other by being attached to the side-plate 18.

In Figure 1 the solid lines show the arm and associated parts in an intermediate position. These parts are shown in dotted-line in positions near the top and bottom of their range of movement.

The operation of the indicator is as follows:—The movement of the mechanism (not shown) moves link 17. This moves arm 14 about the axle 16. As the end of arm 14 moves on an arc, it carries with it the end of the slider 13. This is guided on the straight wire 15, however, and its indicating end 11 is therefore caused to move in a substantially straight line over the scale on chart 12.

Having thus disclosed and described my invention, what I claim as new is:

1. An indicating instrument comprising in combination an angularly movable member, means for actuating said member, a substantially plane chart, an index co-operable therewith, and means interposed between said member and index for causing angular movement of said member to impart substantially rectilinear movement to said index.

2. An indicating device comprising in combination, a substantially plane chart, an index cooperable with said chart, an angularly movable member, and means actuated by the angular movement of said member for moving said index substantially rectilinearly and parallel to said chart.

3. An indicating device comprising in combination a slidable member, rectilinear means guiding said member, angularly movable means actuating said member, index means attached to said member, and a chart co-operating with said index means to produce an indication.

4. An indicator comprising in combination a plane chart, an index movable relatively to and substantially parallel to said chart, a slidable member for actuating said index, guide means for said member, an angularly movable arm actuating said member, and means for attaching said arm to a mechanism whose movement is to be indicated.

5. An indicating apparatus comprising in combination, a substantially plane chart, an index cooperable with said chart, a member and means for moving the same angularly in a plane substantially as right angles to the plane of said chart, and means actuated by the angular movement of said member for moving said index substantially rectilinearly and parallel to said chart.

Signed at Brooklyn in the county of Kings and State of New York this day of April A. D., 1923.

MORRIS M. TITTERINGTON.